(12) United States Patent
Vanhee et al.

(10) Patent No.: US 12,066,084 B2
(45) Date of Patent: Aug. 20, 2024

(54) TRANSMISSION FOR A VEHICLE HAVING AN ELECTROMAGNETIC VARIATOR

(71) Applicant: Dana Belgium N.V., Bruges (BE)

(72) Inventors: Steven Vanhee, Bruges (BE); Bert Hannon, Bruges (BE); Joachim Druant, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/363,539

(22) Filed: Aug. 1, 2023

(65) Prior Publication Data

US 2024/0044394 A1     Feb. 8, 2024

(30) Foreign Application Priority Data

Aug. 2, 2022    (DE) ..................... 20 2022 104 381.7

(51) Int. Cl.
     *F16H 37/08*      (2006.01)
     *F16H 3/72*      (2006.01)
     *F16H 61/66*      (2006.01)

(52) U.S. Cl.
     CPC ............. *F16H 3/725* (2013.01); *F16H 3/72* (2013.01); *F16H 2037/088* (2013.01); *F16H 2061/6602* (2013.01)

(58) Field of Classification Search
     CPC ...... F16H 3/725; F16H 3/72; F16H 2037/088; F16H 2061/6602
     See application file for complete search history.

(56) References Cited

U.S. PATENT DOCUMENTS 9,145,136 B2    9/2015    Suntharalingam et al.
2013/0252773 A1*    9/2013    Suntharalingam ..... B60K 6/387
                                                                  475/5

FOREIGN PATENT DOCUMENTS

DE      102005046531 A1 *   3/2007      ............. B60K 6/445
DE      102007020937 A1 *   12/2008      ............... B60K 6/26
EP      1481463 B1    12/2010
WO      WO-2004088168 A1 *   10/2004      ............. B60K 6/365

* cited by examiner

*Primary Examiner* — Justin Holmes
(74) *Attorney, Agent, or Firm* — McCoy Russell LLP

(57) ABSTRACT

The present disclosure relates to a transmission for a vehicle having a power source, the transmission comprising:
     an input member for receiving power from the power source;
     an output member for outputting power to at least one component of the vehicle;
     at least one power split gear set having a plurality of members and operatively connected between said input member and said output member;
     an electromagnetic variator having a stator, an outer rotor and an inner rotor;
     wherein the inner rotor is at least partially received in the outer rotor and the electromagnetic variator is configured to provide variable torque transmission ratios between the outer rotor and inner rotor; and
     wherein said first and second rotors are each operatively connectable to different ones of said members of said power split gear set and are each operatively connectable to the input member to be driven thereby.

17 Claims, 3 Drawing Sheets

|    | IS-IS | IS-OS | OS-IS | OS-OS |
|----|-------|-------|-------|-------|
| C1 |       |       |   X   |   X   |
| C2 |   X   |       |       |   X   |
| C3 |       |   X   |   X   |       |
| C4 |   X   |       |       |   X   |
| C5 |       |   X   |   X   |       |

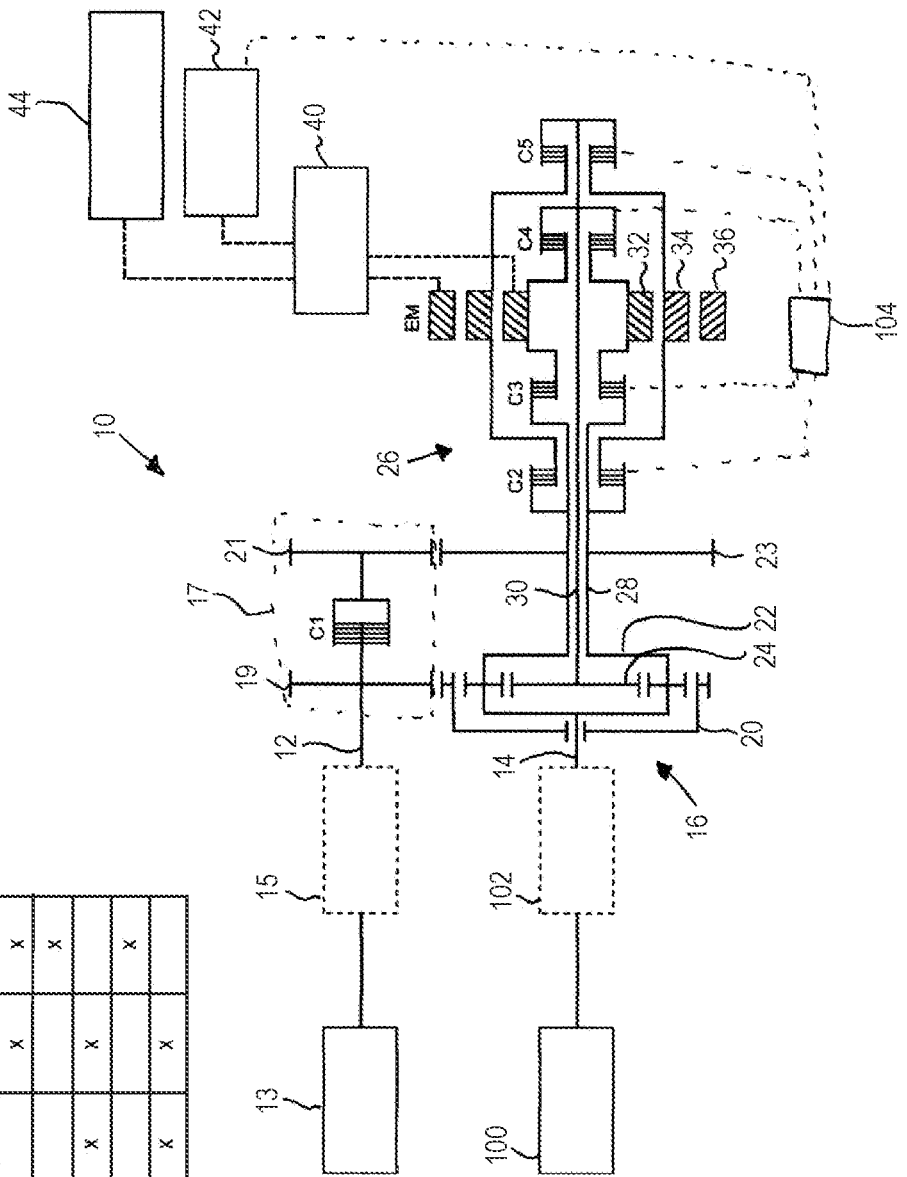

TRANSMISSION FOR A VEHICLE HAVING AN ELECTROMAGNETIC VARIATOR

CROSS-REFERENCE TO RELATED APPLICATION

The present application claims priority to German Utility Model Application No. 20 2022 104 381.7, entitled "TRANSMISSION FOR A VEHICLE HAVING AN ELECTROMAGNETIC VARIATOR", and filed Aug. 2, 2022. The entire contents of the above-listed application is hereby incorporated by reference for all purposes.

TECHNICAL FIELD

The present document primarily relates to a transmission for a vehicle, the transmission having an electromagnetic variator. The vehicle may be a non-track-bound vehicle and more specifically a car, a truck, a bus, a heavy duty road vehicle or an agricultural vehicle, such as a tractor.

BACKGROUND AND SUMMARY

Vehicle transmissions comprising a variator are known in the prior art, for example continuously variable or stepless transmissions. One type of variator is an electromagnetic variator that is configured to receive input power e.g. from an internal combustion engine of the vehicle and convert into output power. The output power is used to drive some unit or component of the vehicle, for example the wheels in order to propel the vehicle.

It is also known to couple the variator with some mechanical gear set, for example with at least one planetary gear set. A configuration with one planetary gear set may be referred to as an input- or output-split transmission. A configuration with two planetary gear sets may be referred to as a compound split transmission.

One known type of electromagnetic variator comprises a succession of two electric machines. This may be referred to as providing back-to-back electric machines. The first electric machine may receive input power and convert it into electric energy. This energy may be converted and stored in a battery to (after another conversion, for example after an inversion) drive the second electric machine according to a desired transmission ratio. The second electric machine may contribute to the output power of the transmission.

A drawback from the above configuration is the large space occupied by the back-to-back electric machines. Also, this approach implies a relatively high maximum variator power ratio, and therefore a high power rating of the motors and power converters, and/or a high mechanical complexity to overcome this issue.

It has therefore been suggested to spatially combine the electric machines by arranging their rotors in an at least partially overlapping manner (e.g. with one rotor being at least partially received in the other rotor) while providing a common stator. Examples can be found in EP 1 481 463 B1 and U.S. Pat. No. 9,145,136 B2.

Apart from the increased compactness, some of these existing designs add an electromagnetic power path directly between the rotors so that not all of the energy generated by converting an input torque has to be power converted (e.g. rectified), stored and re-converted (e.g. inverted) for driving one of the electric machines to provide the output power. This way, the power ratings for the power converter, the battery and/or the electric machines can be lowered.

While the above configurations have certain advantages, there is still room for improvement. This concerns an available range of transmission ratios and/or the extent of required power ratings of the electric components and the associated costs.

Thus, there continues to be demand for a vehicle transmission having an electromagnetic variator with a large range of transmission ratios at limited costs.

This object is solved by the subject-matter as described herein.

Accordingly, a transmission for a vehicle having a power source such as an internal combustion engine or an electric motor is disclosed, the transmission comprising:
- an input member for receiving power from the power source;
- an output member for outputting power to at least one component of the vehicle;
- at least one power split gear set having a plurality of members and operatively connected between said input member and said output member;
- an electromagnetic variator having a stator, an outer rotor and an inner rotor;
- wherein the inner rotor is at least partially received in the outer rotor and the electromagnetic variator is configured to provide variable torque transmission ratios between the outer rotor and inner rotor (e.g. by an electric power path driving one of the rotors, see below); and
- wherein said first and second rotors are each operatively connectable to different ones of said members of said power split gear set and are each operatively connectable to the input member to be driven thereby.

The terms coupled and connected, for example the "operatively connected/connectable" and "operatively coupled/coupable" may be used interchangeably herein. If shown directly coupled in the figure, then in an example the components may be directly coupled.

According to the above configuration, both of the inner and the outer rotor can be connected to different members of the gear set, for example depending on a desired operating mode. Also, they can generally both be driven by the input member. This large variability with respect to forming connections between different members increases the number of possible power flows within the transmission as well as the range of possible transmission ratios. As further detailed below, this may allow selecting power paths and transmission ratios depending on the operating scenario and reducing the required power ratings of the electric components. For example, by way of said selections, the electric components can operated at low electric power.

Further, due to the rotors being arranged in an overlapping manner (e.g., being received in one another), the above-explained electromagnetic powerpath can be established between them. This may reduce required power ratings of e.g. power converters of the variator, thereby reducing component costs.

The input member may be an input shaft. The output member may be an output shaft and/or may comprise an output gear stage connected to an output shaft. The optional output gear stage may be provided independently of and/or spatially separated from the power split gear set.

The power split gear set may be a planetary gear set. One gear component, for example the planet carrier of the planetary gear set may be coupled to the output member. It may be coupled directly thereto without any intermediate gear stage of the power split gear set. Another gear component, for example the ring gear of the planetary gear set may be coupled to the input member, e.g. indirectly by an optional input gear stage discussed below.

The variator may comprise at least one stator. The stator may be provided radially outside, in between or within the rotors. The rotors may rotate about a common rotation axis. The variator may be arranged concentrically to said rotation axis. The variator may comprise power electronics. For example, it may comprise at least one power converter (for example an inverter and/or a rectifier, e.g. a converter than can selectively operate as both). It may comprise an electric energy storage, for example a battery.

The variator may comprise or be connected to at least one clutch and e.g. four clutches (for example two per rotor). The clutch may be configured to couple the inner rotor or the outer rotor to any of the members disclosed herein, for example in order to switch between any of the operating modes disclosed herein. For example, at least one of the inner and outer rotor may be connected to one clutch that can selectively couple said rotor to the input member (e.g. indirectly and including a torque conversion by the planetary gear set) and another clutch to selectively couple said rotor to the output member (e.g. independently of a torque conversion by the planetary gear set).

According to a further embodiment, the electromagnetic variator is configured to convert mechanical energy received by at least one of the rotors at least partially into electric energy, thereby providing at least some of the variable torque transmission ratios. For example, the extent of said conversion and/or the extent to which said electric energy is then used to drive the output may define a transmission ratio. This extent may at least partially be determined by power electronics of the variator, for example by an optional power converter of the variator.

In one example, the electromagnetic variator is configured to convert mechanical energy received (from the input) by at least one of the rotors at least partially into electromagnetic energy which is transferred to the respective other rotor. For example, when being rotated by the torque relative to a stator of the variator, a current and a magnetic field are generated by the rotor. The respective other rotor can be subjected to said field, thereby receiving electromagnetic energy. This may support or enhance its rotation, e.g. when being driven by electric energy from an optional energy storage (e.g. a battery) of the variator.

Accordingly, the variator may be configured to provide a first power path according to which input mechanical energy is at least partially converted into electric energy (e.g. by the rotating a first one of the rotors), wherein said electric energy is at least partially converted and/or stored to then be used for driving the respective other rotor. This results in converting the electrical energy back into mechanical energy. Note that the conversions of mechanical energy into electric energy and from electric energy into mechanical energy may each include an intermediate conversion into magnetic energy. This can increase losses. Also, this power path may include usage of at least one power converter whose power rating has to be respectively adjusted to the expected power levels of energy conversion.

Additionally or alternatively, the variator may be configured to provide the electromagnetic (second) power path discussed above. For example when provided in addition to above first electric power path, this means that at least part of the initially received mechanical energy is or may be converted into electromagnetic energy and transferred from one rotor to the other without necessarily using a power converter and/or optional energy storage. This may lower the respective power ratings of these components and thus the overall costs. The extent of electromagnetic power transferred to a driven rotor may equally define one or more transmission ratios of the variator.

As indicated above, the electromagnetic variator may be configured to actively drive at least one of the rotors based on stored electrical energy, thereby providing at least some of the variable torque transmission ratios. For example, an optional power converter may set the amount of energy used for driving said rotor, thereby setting a transmission ratio.

Generally, the disclosed variator may be configured to steplessly vary its transmission ratios, e.g. it may be infinitely or continuously variable. For example, the optional power converter may steplessly vary the amount of energy used for driving one of the rotors, thereby steplessly varying the transmission ratio.

Each rotor may be operatively coupable (for example alternatingly) to at least one common member of the power split gear set. Put differently, they may generally be connectable to at least one same member of the power split gear set. Yet, this connection may not be made simultaneously. Rather, either the inner rotor or the outer rotor may be coupled to said common member depending on a selected operating mode of the transmission.

In this connection, the common member may be a carrier of the planetary gear set and/or the common member may be a sun gear or ring gear of the planetary gear set.

The term "operatively connected" or "operatively coupled" as used herein may generally concern a relation according to which operating one member at least partially or at least indirectly causes an operation of the respectively coupled member. The coupling/connection may be mechanical, so that the operative coupling/connection may concern a transfer of mechanical energy and/or the existence of a mechanical power path between the members. It may e.g. include a respective mechanical coupling by a clutch, by members of the power split gear set and/or by other gear sets or other torque transmitting connections within the transmission.

According to an embodiment the transmission comprises a plurality of selectively activatable torque transmitting units, e.g. to provide the operative couplings and operative decouplings described herein. The torque transmitting units may be or comprise clutches. As noted above, at least one of them may be comprised by the variator.

According to a further example, the transmission is operable according to a plurality of operating modes, each operating mode being marked by individual operative connections and operative disconnections between each of the inner and outer rotors and the members of said planetary gear set as well as between each of the inner and outer rotors and the input member and/or output member.

The operating modes may comprise at least one operating mode in which torque received by the inner rotor is at least partially converted into torque output by the outer rotor and at least one operating mode in which torque received by the outer rotor is at least partially converted into torque output by the inner rotor. As noted above, this may include conversions into electric energy and/or into electromechanical energy. In other words, this may include establishing electric and/or electromagnetic power paths within the variator.

Additionally or alternatively, the operating modes may comprise at least one operating mode in which one of the inner and outer rotor is coupled to the input member independently of the power split gear set (e.g. without an intermediated torque conversion by the power split gear set)

and/or at least one operating mode in which one of the inner and outer rotor is coupled to the input member by the power split gear set.

The operating modes may comprise a first operating mode (IS-IS) which may be referred to as input-split input-split mode. This relates to an input power split by the power split gear set that is combined with an input power split by the variator. In said operating mode, the input member is operatively connected to the inner rotor via a member of the power split gear set (e.g. the input member at least indirectly drives the inner rotor under torque conversion of/by the power split gear set). Torque received by the inner rotor is at least partially converted into torque output by the outer rotor. The outer rotor is connected to the output member, e.g. via another member of the power split gear set. This may include the output and outer rotor being connected to the same (other) member of the power split gear set. Put differently, the inner rotor may be directly connected to the output without an intermediate torque conversion by a gear stage of the variator.

Additionally or alternatively, the operating modes may comprise a second operating mode (IS-OS) which may be referred to as input-split output-split mode. This relates to an input power split by the power split gear set that is combined with an output power split by the variator. In said operating mode, the input member is operatively connected to the outer rotor via a member of the power split gear set (e.g. the input member at least indirectly drives the outer rotor under torque conversion of/by the power split gear set). Torque received by the outer rotor is at least partially converted into torque output by the inner rotor, wherein the inner rotor is connected to the output member, e.g. via another member of the power split gear set. This may include the output and inner rotor being connected to the same (other) member of the power split gear set. Put differently, the inner rotor may be directly connected to the output without an intermediate torque conversion by a gear stage of the variator.

The operating modes may, additionally or alternatively, comprise a third operating mode (OS-IS) which may be referred to as output-split input-split mode. This relates to an output power split by the power split gear set that is combined with an input power split by the variator. In said operating mode, the input member is operatively connected to the inner rotor independently of the power split gear set (e.g. without any torque conversion by the power split gear set in between). Torque received by the inner rotor is at least partially converted into torque output by the outer rotor, wherein the outer rotor is connected to the output member. This may include the outer rotor being (e.g. directly) connected to a member of the power split gear set that is different from a member of the power split gear set to which the output is (e.g. directly) connected. Accordingly, the outer rotor may be indirectly coupled to the output member by at least one gear stage of and/or a torque conversion by the power split gear set.

The operating modes may, additionally or alternatively, comprise a fourth operating mode (OS-OS) which may be referred to as output-split output-split mode. This relates to an output power split by the power split gear set that is combined with an output power split by the variator. In said operating mode, the input member is operatively connected to the outer rotor independently of the power split gear set (e.g. without any torque conversion by the power split gear set in between). Torque received by the outer rotor is at least partially converted into torque output by the inner rotor. The inner rotor is connected to the output member. This may include a (e.g. direct) coupling to a member of the power split gear set that is different from a member of the power split gear set to which the output is (e.g. directly) connected (e.g. directly connected. Accordingly, the inner rotor may be indirectly coupled to the output member by at least one gear stage of and/or a torque conversion by the power split gear set.

In one aspect, at least two of the first to fourth operating modes (IS-IS, IS-OS, OS-IS, OS-OS) are provided and the transmission is configured to switch between said modes depending on an amount of electrical power generated within and/or by the electromagnetic variator. Said power may be a function of the input power, e.g. of the rotations per minute (rpm) of the power source and/or of the input member.

This switching may include activating any of the selectively activatable torque transmitting units disclosed herein. Additionally or alternatively, it may include controlling a power converter of the variator accordingly, e.g. with respect to switching between a rectifying or inverting mode and/or setting the level of converted current appropriately.

The transmission may comprise at least one (e.g. central or distributed) control system for switching between the operating modes. The control system may comprise at least one microcontroller or processor. It may control any of the torque transmitting units and/or electric components of the variator (e.g. a power converter) for performing any operating mode switches disclosed herein.

The point of switching between the operating modes may be selected so that a variator power-split ratio (VPR) is reduced. This concerns the ratio between the power received by the electromagnetic variator and the power received by the transmission from the power source. This reduction may e.g. be achieved by switching from IS-OS to OS-OS, e.g. when surpassing a certain rpm threshold of any of the power source, the input member and the output member.

If reducing this ratio, the variator is exposed to lower electric power, so that the required maximum power ratings of its electric components can equally be reduced.

Additionally or alternatively, the point of switching between the operating modes may be selected so that an electrical-variator power split ratio (EVPR) is reduced. This concerns the ratio between electrical power generated within the electromagnetic variator and the power received by the electromagnetic variator. This reduction may e.g. be achieved by switching from OS-IS to IS-OS and/or from IS-OS to OS-OS, e.g. when surpassing respectively defined rpm thresholds of any of the power source, the input member and the output member.

If reducing this ratio, the variator generates less electric power, so that the required maximum power ratings of its electric components can equally be reduced.

Additionally or alternatively, the point of switching between the operating modes may be selected so that an electrical power split ratio (EPR) is reduced. This concerns the ratio between electrical power generated within (and e.g. stored by) the electromagnetic variator and the power received by the transmission from the power source. This reduction may be achieved by switching from OS-OS to IS-OS and/or from IS-OS to OS-IS and/or from OS-IS to OS-OS, e.g. when surpassing respectively defined certain rpm threshold of any of the power source, the input member and the output member. Accordingly, a switching sequence at increasing rpm may be provided as follows: OS-OS to IS-OS to OS-IS to OS-OS.

Again, if reducing this ratio, the variator generates less electric power, so that the required maximum power ratings of its electric components can equally be reduced.

According to a further embodiment, at least the first operating mode (IS-IS) and fourth operating mode (OS-OS) are provided and the first operating mode (IS-IS) is activated within a lower range of output speeds than the fourth operating mode (OS-OS).

In one aspect, at least one of the second and third operating mode (IS-OS, OS-IS) may be additionally provided and is activated within a range of output speeds in between those ranges of output speeds in which the first operating mode (IS-IS) and the fourth operating mode (OS-OS) are activated.

According to a further development, both of the second and third operating modes (IS-OS, OS-IS) are additionally provided and the second operating mode (IS-OS) is activated within a lower range of output speeds than the third operating mode (OS-IS).

With the above modes and the switches therebetween, the previously discussed ratios and/or the required maximum power ratings of the variator's electric components can be reduced.

The present document further relates to a method for operating a transmission, the transmission being configured according to any of the examples disclosed herein. Also, the method may include any of the steps and measures disclosed herein, for example with respect to mode switching.

Embodiments of the presently proposed subject matter are discussed in the following with reference to the schematic figures.

BRIEF DESCRIPTION OF THE FIGURES

FIG. 1 shows a transmission of the presently proposed type.

FIG. 2 is a table showing opening and closing states of clutches in the transmission of FIG. 1.

DETAILED DESCRIPTION

Figure 3A:
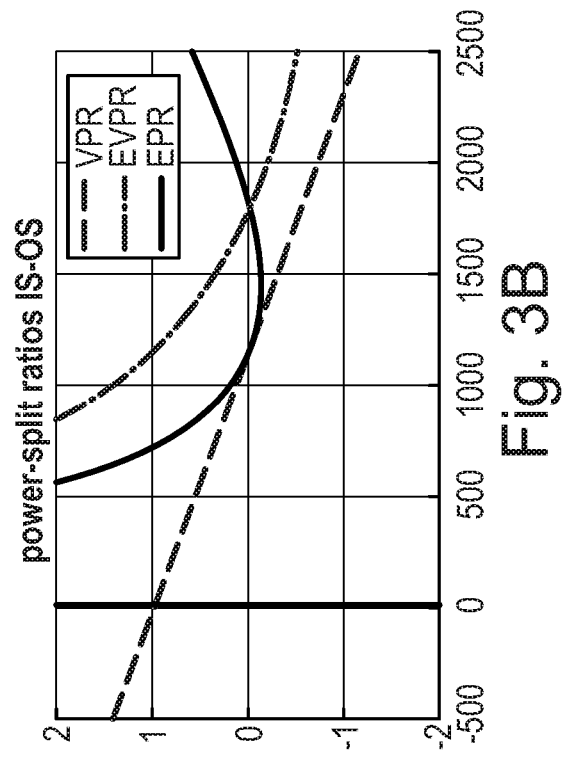
FIGS. 3A-3D show the course selected transmission ratios for various operating modes of the transmission of FIG. 1.

FIG. 1 shows a transmission 10 of the presently proposed type which may be used in a road vehicle (not illustrated). The transmission 10 comprises an input member in the form of an input shaft 12. Further, the transmission 10 comprises an output member in the form of an output shaft 14.

The output shaft 14 drives a component 100 of the vehicle, such as wheel. It may be connected to said component 100 by an optional further output gear stage 102.

The input shaft 12 receives mechanical power (e.g. torque) from a power source 13 such as an internal combustion engine or an electric motor, for example. An optional forward/reverse gear selection mechanism 15 may connect the power source 13 and the input shaft 12 and transmit torque therebetween.

The input shaft 12 is connected to an optional input gear set 17. The input gear set 17 includes a first input gear 19 and a second input gear 21 which may be drivingly engaged with each other by a clutch C1. The first input gear 19 is coupled to a power split gear set of the transmission 10 in the form of a planetary gear set 16. The second input gear 21 is coupled to a connecting gear 23 discussed below.

The planetary gear set 16 comprises a ring gear 20, a carrier 22 carrying one or more planetary gears and a sun gear 24. The carrier 22 is connected to the output shaft 12.

The ring gear 20 is connected to the first input gear 19. The carrier 22 and the sun gear 24 are coupled to clutches C2, C3, C4, C5 of an electromagnetic variator 26 of the transmission 10.

More specifically, the transmission 10 includes a first connection shaft 28 connecting the carrier 22 to the connecting gear 23 and to a first and second clutch C2, C3 of the electromagnetic variator 26, and a second connection shaft 30 connecting the carrier 22 to a third and fourth clutch C4, C5 of the electromagnetic variator 26.

The electromagnetic variator 26 comprises an inner rotor 32 and an outer rotor 34 each configured to rotate about a rotation axis that coincides with the second connection shaft 30 in FIG. 1. The inner rotor 32 has smaller radial dimensions that the outer rotor 34. The inner rotor 32 is received and/or surrounded by the outer rotor 34. For example, the inner rotor 32 and the outer rotor 34 are arranged to axially overlap with one another. This may increase spatial compactness and may allow to establish an electromagnetic power path between the inner rotor 32 and the outer rotor 34.

The inner rotor 32 and the outer rotor 34 are both received in a stator 36 having a radially larger dimension (e.g. diameter) than said rotors 32, 34. Also, the stator 36 axially overlaps with said rotors 32, 34.

The first, second, third and fourth clutch C2-C5 of the electromagnetic variator 26 are further connected as follows: The first clutch C2 is connected to the outer rotor 34. The second clutch C3 is connected to the inner rotor 32. The third clutch C4 is connected to the inner rotor 32. The fourth clutch C5 is connected to the outer rotor 34.

The first, second, third and fourth clutch C2-C5 thus provide a selectively activatable torque transmission between the respectively connected one of the first and second connection shaft 28, 30 and the respectively connected one of the inner and the outer rotor 32, 34. The selective activation includes closing a respective clutch C2-C5 which is normally open.

The opening and closing of the clutches C1-C5 of the transmission 10 is controlled by a control system 104. A control signal connection is present between the control system 104 and each of the clutches C1-C5 but is not specifically indicated for the first clutch C1 for illustrative reasons.

As electric components, the electromagnetic variator 26 comprises a power converter 40 controlled by a control unit 42. The control unit 42 may be an integrated part of the control system 104 or may be separately provided but communicate with the control system 104. A further electric component is an electric energy storage in the form of a battery 44.

FIG. 1 indicates that the transmission 10 includes several electric power connections between the rotors 32, 34 as well as between the stator 36 and the electric components 40-44. Also, the transmission 10 includes an electric power connection between the battery 44 and power converter 40 as well as a control signal connection between the power converter 40 and the control unit 42.

Depending on whether electric power is transferred to or received from the battery 44, the power converter 44 is operable (under control by the control unit 42) either as a rectifier (transferring power to the battery 44) or as an inverter (receiving power from the battery 44). The control unit 42 is also configured to set the respective extents of power conversion, e. g. depending on a requested output speed, thereby setting and varying transmission ratios of the variator 26.

The transmission 10 is operable according to four operating modes each of which provides a continuous range of transmission ratios. As further explained below, the operating modes are typically activated consecutively (e. g. depending on a current or desired output speed) to maintain limited electric power levels within the electromagnetic variator 26. This may reduce the required power ratings of the electric components 40-44, thus saving weight, space and costs.

Each of the operating modes corresponds with a defined combination of opened and closed clutches C1-C5 of the transmission 10. The opening and closing actions are usually controlled by the control system 104.

FIG. 2 illustrates the opening (no x) and closing states (x) for each of the clutches C1-C5 in each of the operating modes.

A first operating mode is an input-split input-split mode (IS-IS) with the first and third clutches C2, C4 of the transmission 10 closed.

A second operating mode is an input-split output-split mode (IS-OS) with the second and fourth clutches C3, C5 of the transmission 10 closed.

A third operating mode is an output-split input-split mode (OS-IS) with the second and fourth clutches C3, C5 of the transmission 10 closed and with the clutch C1 of the input gear set 17 closed.

A fourth operating mode is an output-split output-split mode (OS-OS) with the first and third clutches C2, C4 of the transmission 10 and with the clutch C1 of the input gear set 17 closed.

The power paths and energy flows within the transmission 10 in each of the operating modes described are as follows.

In the IS-IS mode, mechanical energy (e.g. torque) received at the input shaft 12 of the transmission 10 is transferred to the ring gear 20 of the planetary gear set 16 by or via the first input gear 19. The ring gear 20 transmits said energy to the carrier 22 and to the sun gear 24 which drives the second connection shaft 30. Since the third clutch C4 is closed, the inner rotor 32 rotates and generates electric energy. Said energy is converted and stored by the components 40, 44 and is or may be partially used to drive the outer rotor 34. Also, an electromagnetic power path is established between the inner rotor 32 and the outer rotor 34.

The outer rotor 34 is coupled to the second connecting shaft 28 by the first clutch C2. Therefore, it is directly coupled to the output shaft 14 by the carrier 22.

In the IS-OS mode, mechanical energy received at the input shaft 12 of the transmission 10 is transferred to the ring gear 20 of the planetary gear set 16 by or via the first input gear 19. The ring gear 20 transmits said energy to the carrier 22 and to the sun gear 24 which drives the first connection shaft 28. Since the fourth clutch C5 is closed, the outer rotor 35 rotates, thereby generating electric energy which is converted and stored by the components 40, 44 and which is or may be partially used to drive the inner rotor 32. Also, an electromagnetic power path is established between the inner rotor 32 and the outer rotor 34.

The inner rotor 32 is coupled to the second connecting shaft 30 by the second clutch C3. Therefore, the inner rotor 32 is directly coupled to the output shaft 14 by or via the carrier 22.

In the OS-IS mode, as the clutch C1 of the input gear set 17 is closed, mechanical energy received at the input shaft 12 of the transmission 10 is at least partially directly transferred to the electromagnetic variator 26. Specifically, the second input gear 21 is driven, thus transferring torque to the second connection shaft 30 via the connecting gear 23. Since the second clutch C3 is closed, the inner rotor 32 rotates, thereby generating electric energy which is converted and stored by the components 40, 44 and which is or may be partially used to drive the outer rotor 34. Also, an electromagnetic power path is established between the inner rotor 32 and outer rotor 34.

The outer rotor 34 is coupled to the first connecting shaft 28 by the fourth clutch C5. Therefore, the outer rotor 34 is indirectly coupled to the output 14 by or via the gear stage comprising the sun gear 24 and the carrier 22.

In the OS-OS mode, as the clutch C1 of the input gear set 17 is closed, mechanical energy received at the input shaft 12 of the transmission 10 is at least partially directly transferred to the electromagnetic variator 26. Specifically, the second input gear 21 is driven thus transferring torque to the second connection shaft 30 via the connecting gear 23. Due to the closed first clutch C2, the outer rotor 34 rotates generating electric energy converted and stored by the components 40, 44 and partially used to drive the inner rotor 32. Also, an electromagnetic power path is established between the inner rotor 32 and outer rotor 34.

The inner rotor 32 is coupled to the first connecting shaft 28 by the third clutch C4. Therefore, it is indirectly coupled to the output 14 by the gear stage comprising the sun gear 24 and carrier 22.

In each of these modes, the speed of the electrically driven rotor 32, 34 can be variably set under control of the power converter 40, thus defining a range of transmission ratios of the electromagnetic variator 26.

Figure 3B:
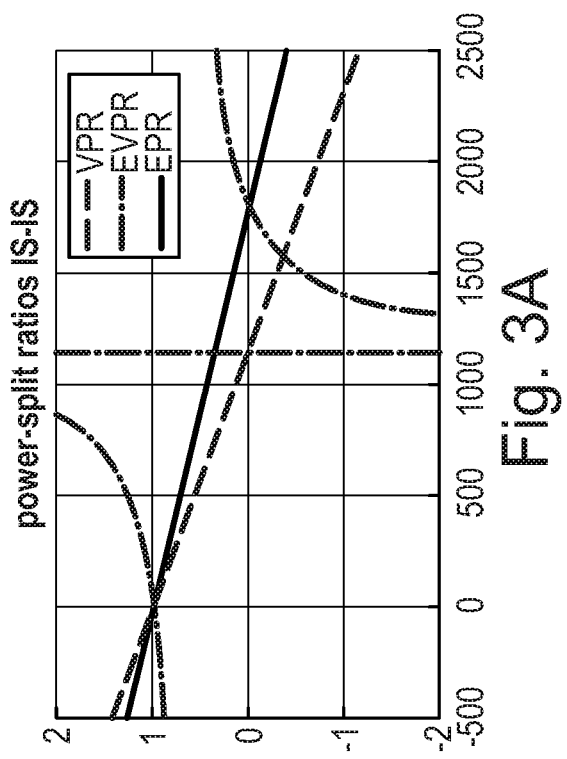

In the IS-OS mode of FIG. 3B, the VPR decreases linearly with the output speed. The output-split mode of the electromagnetic variator 26 reduces the electrical power under high speed operating conditions (corresponding to speeds above 1200 rpm, for example).

Figure 3C:
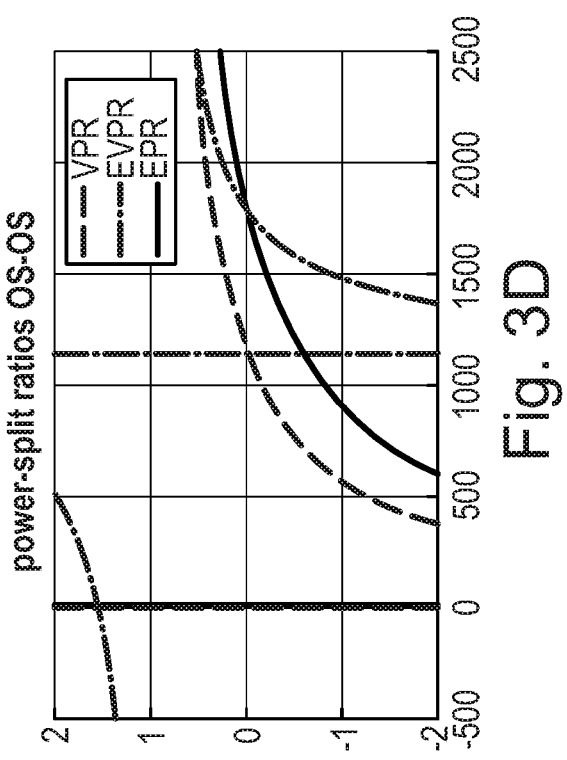

The transmission 10 may function in a similar manner in the OS-IS mode of FIG. 3C. This mode allows avoiding negative VPRs under high speed operating conditions, thereby avoiding or reducing power recirculation. The input-split mode of the electromagnetic variator 26 introduces power recirculation in the electrical power path. However, the absolute electrical power is than in known mechanical output-split power split transmissions.

Figure 3D:
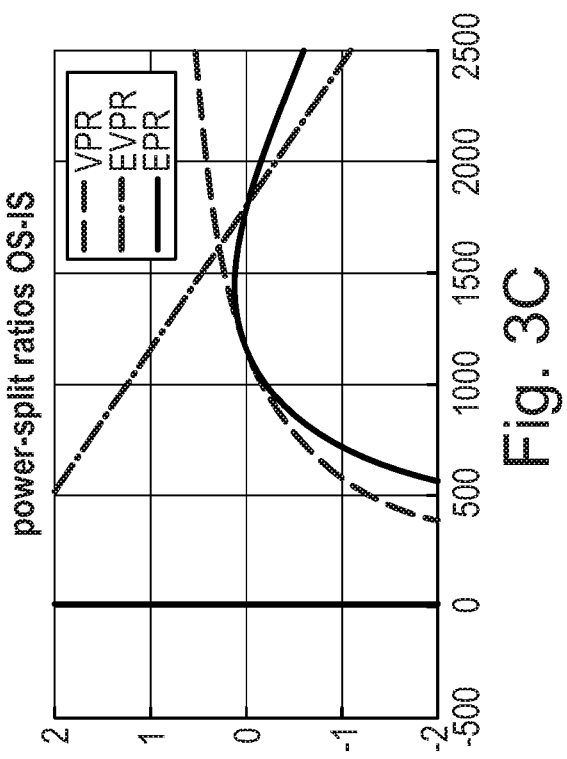

In the OS-OS mode of FIG. 3D, the EVP is significantly lower than the VPR under very high operating speeds (such as above 1800 rpm, for example).

Figure 4A:
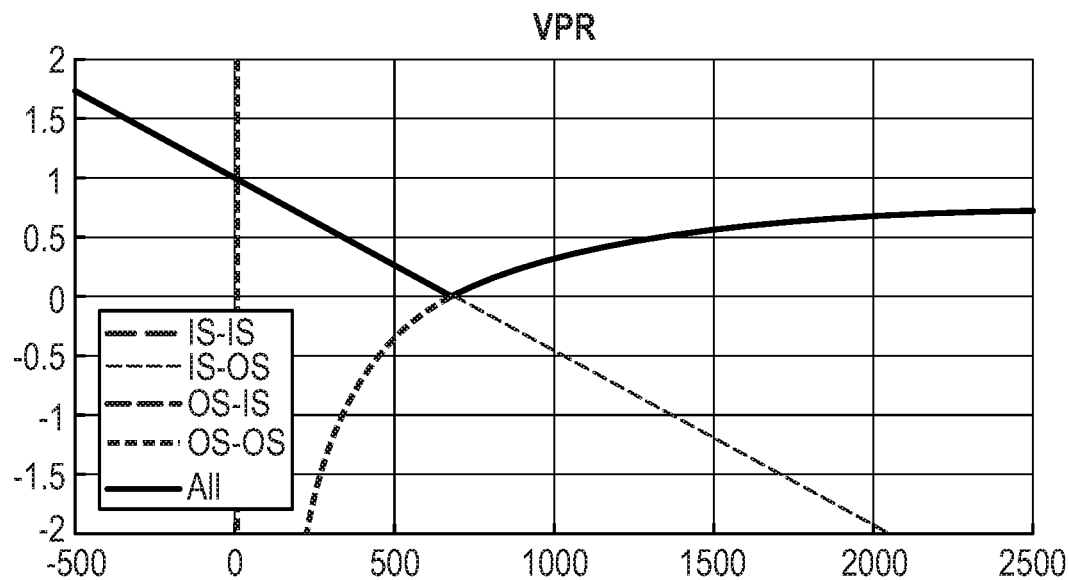
FIGS. 4A-4B are an alternative way of presenting the data of FIGS. 3A-3D.
Figure 4B:
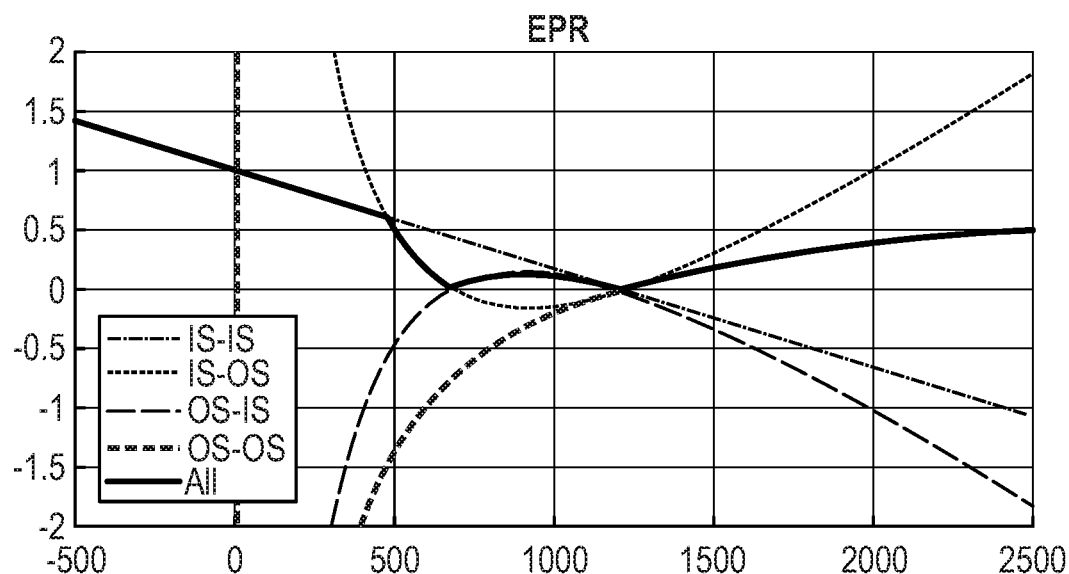

FIGS. 4A-4B present part of the same data as FIGS. 3A-3D in a different way. The VPR and EPR of all different operating modes of FIGS. 3A-3D are plotted on a single plot for each of said ratios. The dotted lines in FIGS. 4A and 4B represent the minimal VPR or EPR which can be achieved with the transmission 10.

It can be observed that a minimum EPR can be reached by switching between all the different operating modes of the multi-mode power split transmission 10. In reverse and when running at low forward speeds, the IS-IS mode results in the lowest EPR. Between about 800 rpm and about 1200 rpm, the IS-OS mode has the lowest EPR. Between 1200 rpm and 1800 rpm the OS-IS mode has the optimal EPR, and starting from 1800 rpm the OS-OS mode results in the lowest EPR.

Additionally, it can be observed that over the entire positive speed range the optimal VPR and EPR are positive and below 1. As noted above, this implies that no power recirculation is present, typically resulting in a higher efficiency of the system.

Also, it can be observed that the EPR of FIG. 4B is mostly lower than the VPR of FIG. 4A for any given output speed.

Especially at higher output speeds, the EPR is almost only half of the VPR, leading to a reduced cost of e. g. power converters 42.

The invention claimed is:

1. A transmission for a vehicle having a power source, the transmission comprising:
   an input member for receiving power from the power source;
   an output member for outputting power to at least one component of the vehicle;
   at least one power split gear set having a plurality of members and operatively connected between said input member and said output member; and
   an electromagnetic variator having a stator, an outer rotor, and an inner rotor;
   wherein the inner rotor is at least partially received in the outer rotor and the electromagnetic variator is configured to provide variable torque transmission ratios between the outer rotor and the inner rotor; and
   wherein said inner and outer rotors are each selectively operatively connectable to different ones of said plurality of members of said power split gear set by a plurality of selectively activatable torque transmitting units and are each selectively operatively connectable to the input member to be driven thereby by the plurality of selectively activatable torque transmitting units.

2. The transmission according to claim 1, wherein the power split gear set is a planetary gear set.

3. The transmission according to claim 1, wherein the electromagnetic variator is configured to convert mechanical energy received by at least one of the rotors at least partially into electric energy, thereby providing at least some of the variable torque transmission ratios, and/or
   wherein the electromagnetic variator is configured to convert mechanical energy received by at least one of the rotors at least partially into electromagnetic energy which is transferred to the respective other rotor.

4. The transmission according to claim 1, wherein the electromagnetic variator is configured to actively drive at least one of the rotors based on stored electrical energy, thereby providing at least some of the variable torque transmission ratios.

5. The transmission according to claim 1, wherein each rotor is operatively connectable to at least one common member of the power split gear set.

6. The transmission according to claim 5, wherein the common member is a carrier of the planetary gear set, and/or wherein the common member is a sun gear of the planetary gear set.

7. The transmission according to claim 1, wherein the transmission is operable according to a plurality of operating modes, each operating mode being marked by individual operative connections and operative disconnections between each of the inner and outer rotors and the members of said planetary gear set as well as between each of the inner and outer rotors and the input member.

8. The transmission according to claim 7, wherein the operating modes comprise at least one operating mode in which torque received by the inner rotor is at least partially converted into torque output by the outer rotor and at least one operating mode in which torque received by the outer rotor is at least partially converted into torque output by the inner rotor.

9. The transmission according to claim 8, wherein the operating modes comprise at least one operating mode in which one of the inner rotor and the outer rotor is operatively connected to the input member independently of the power split gear set and/or at least one operating mode in which one of the inner and outer rotors is operatively connected to the input member via the power split gear set.

10. The transmission according to claim 7, wherein the plurality of selectively activatable torque transmitting units provide the operative connections and operative disconnections.

11. The transmission according to claim 7, wherein the operating modes comprise at least one of the following:
    a first operating mode in which the input member is operatively connected to the inner rotor via a member of the power split gear set and torque received by the inner rotor is at least partially converted into torque output by the outer rotor, wherein the outer rotor is connected to the output member via another member of the power split gear set;
    a second operating mode in which the input member is operatively connected to the outer rotor via a member of the power split gear set and torque received by the outer rotor is at least partially converted into torque output by the inner rotor, wherein the inner rotor is connected to the output member via another member of the power split gear set;
    a third operating mode in which the input member is operatively connected to the inner rotor independently of the power split gear set and torque received by the inner rotor is at least partially converted into torque output by the outer rotor, wherein the outer rotor is connected to the output member via a member of the power split gear set that is different from a member of the power split gear set to which the output member is connected; and
    a fourth operating mode in which the input member is operatively connected to the outer rotor independently of the power split gear set and torque received by the outer rotor is at least partially converted into torque output by the inner rotor, wherein the inner rotor is connected to the output member via a member of the power split gear set that is different from a member of the power split gear set to which the output member is connected.

12. The transmission according to claim 11, wherein at least two of the operating modes are provided and the transmission is configured to switch between said modes depending on an amount of electrical power generated by the electromagnetic variator.

13. The transmission according to claim 11, wherein a point of switching between the operating modes is selected so that at least one of the following is reduced:
    a variator power-split ratio which concerns a ratio between power received by the electromagnetic variator and power received by the transmission from the power source;
    an electrical-variator power split ratio which concerns a ratio between electrical power generated within the electromagnetic variator and the power received by the electromagnetic variator; and
    an electrical power split ratio which concerns a ratio between electrical power generated within the electromagnetic variator and the power received by the transmission from the power source.

14. The transmission according to claim 11, wherein at least the first operating mode and the fourth operating mode are provided and the first operating mode is activated within a lower range of output speeds than the fourth operating mode.

15. The transmission according to claim 14, wherein at least one of the second and third operating modes is additionally provided and is activated within a range of output speeds in between those ranges of output speeds in which the first operating mode and the fourth operating mode are activated.

16. The transmission according to claim 15, wherein both of the second and third operating modes are additionally provided and the second operating mode is activated within a lower range of output speeds than the third operating mode.

17. A transmission for a vehicle having a power source, the transmission comprising:
- an input member for receiving power from the power source;
- an output member for outputting power to at least one component of the vehicle;
- at least one power split gear set having a plurality of members and operatively connected between said input member and said output member; and
- an electromagnetic variator having a stator, an outer rotor, and an inner rotor;
- wherein the inner rotor is at least partially received in the outer rotor and the electromagnetic variator is configured to provide variable torque transmission ratios between the outer rotor and the inner rotor;
- wherein said inner and outer rotors are each operatively connectable to different ones of said plurality of members of said power split gear set and are each operatively connectable to the input member to be driven thereby;
- wherein the transmission is operable according to a plurality of operating modes, each operating mode being marked by individual operative connections and operative disconnections between each of the inner and outer rotors and the plurality of members of said planetary gear set as well as between each of the inner and outer rotors and the input member;
- wherein the operating modes comprise at least one of the following:
  - a first operating mode in which the input member is operatively connected to the inner rotor via a member of the power split gear set and torque received by the inner rotor is at least partially converted into torque output by the outer rotor, wherein the outer rotor is connected to the output member via another member of the power split gear set;
  - a second operating mode in which the input member is operatively connected to the outer rotor via a member of the power split gear set and torque received by the outer rotor is at least partially converted into torque output by the inner rotor, wherein the inner rotor is connected to the output member via another member of the power split gear set;
  - a third operating mode in which the input member is operatively connected to the inner rotor independently of the power split gear set and torque received by the inner rotor is at least partially converted into torque output by the outer rotor, wherein the outer rotor is connected to the output member via a member of the power split gear set that is different from a member of the power split gear set to which the output member is connected; and
  - a fourth operating mode in which the input member is operatively connected to the outer rotor independently of the power split gear set and torque received by the outer rotor is at least partially converted into torque output by the inner rotor, wherein the inner rotor is connected to the output member via a member of the power split gear set that is different from a member of the power split gear set to which the output member is connected; and
- wherein at least the first operating mode and the fourth operating mode are provided and the first operating mode is activated within a lower range of output speeds than the fourth operating mode.

* * * * *